United States Patent Office 3,053,490
Patented Sept. 11, 1962

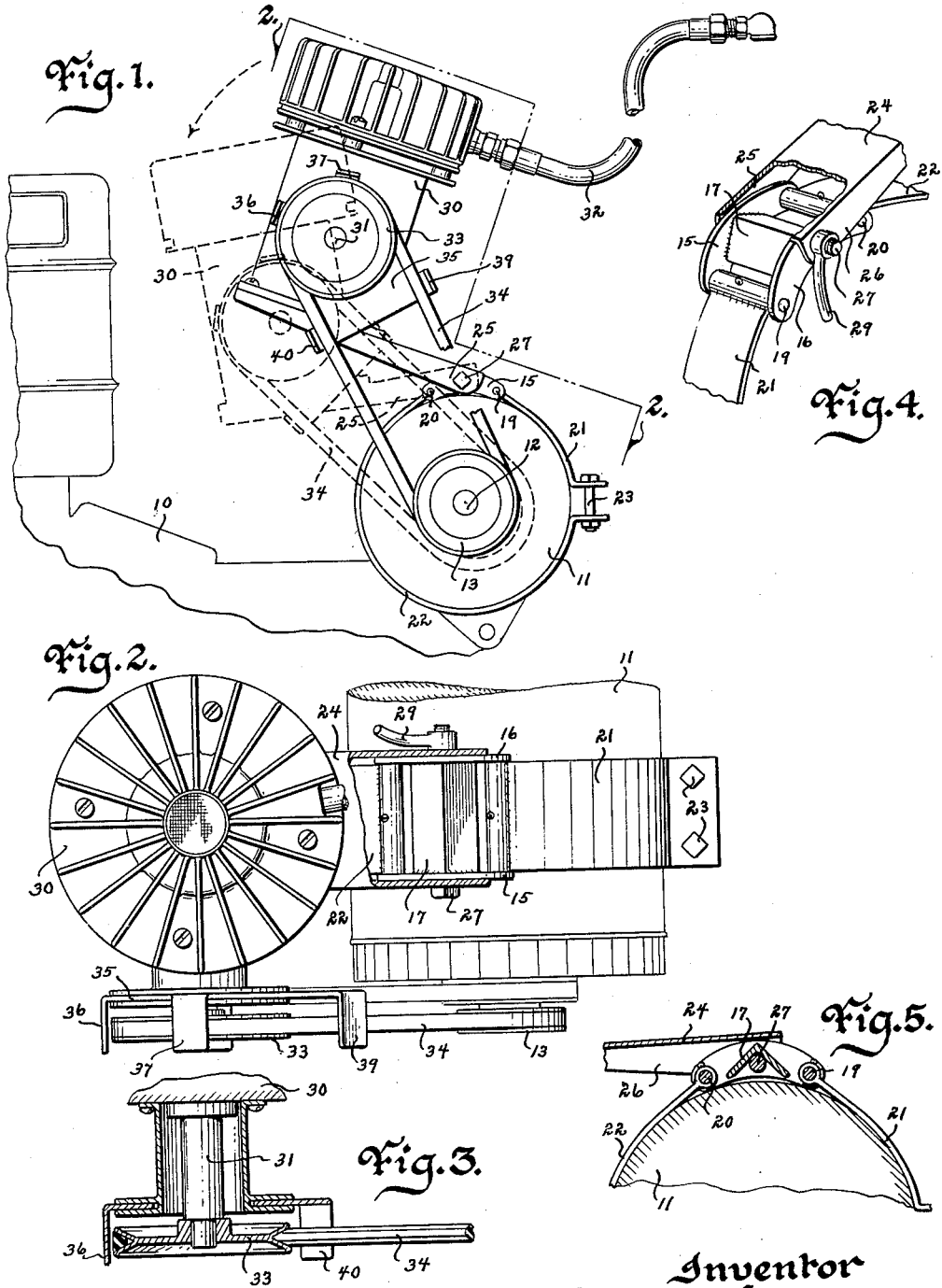

3,053,490
AIR COMPRESSOR FOR INTERNAL COMBUSTION
ENGINE POWERED AUTOMOTIVE VEHICLES
Richard J. Weeks, 6210 Northwest Drive,
Des Moines, Iowa
Filed Oct. 5, 1959, Ser. No. 844,363
2 Claims. (Cl. 248—17)

This invention relates to an air compressor for use on internal combustion engine powered automotive vehicles and more particularly to a means for mounting and operatively connecting the compressor to the internal combustion engine.

With more leisure time available, more and more people are traveling by automobile. Quite often they have pneumatic equipment such as air mattresses, air inflated boats, air life jackets, air inflated rafts, air pressured lighting means, pneumatic pillows, and like. Most such equipment is blown up by lung exhaling each time the item is used and obviously the process involves considerable labor and time. Even if a hand pump is utilized, a great amount of effort and time is required to inflate an article such as a sleeping mattress. Furthermore, it is quite common during vehicle travel to experience the misfortune of having a pneumatic vehicle tire that requires inflating. Also there are many times even when not traveling away from home that a source of air under pressure is needed.

Therefore one of the principal objects of my invention is to provide an easily installed air compressor for use on and with the prime mover of an automotive vehicle.

A further object of this invention is to provide an air compressor for use on a vehicle engine that is easily and quickly operatively connected to the power shaft of the engine and as easily and quickly disconnected therefrom.

More specifically the object of this invention is to provide an air compressor capable of being actuated by one of the belts of a vehicle engine.

Still further objects of my invention are to provide an air compressor for automotive vehicles such as automobiles, trucks, and like that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is an end view of my device installed and ready for use;

FIG. 2 is a top plan view of my installed air compressor taken on line 2—2 of FIG. 1 and more fully illustrates its construction;

FIG. 3 is an enlarged sectional view of the compressor shaft portion of the unit;

FIG. 4 is an enlarged perspective sectional view of the hinged compressor base platform; and FIG. 5 is an enlarged end sectional view of the hinged area of the compressor.

In these drawings I have used the numeral 10 to generally designate the engine of an automotive vehicle. This engine has the usual generator 11 and its shaft 12 which is operatively connected to the power shaft of the engine. Although my device may be secured to the engine to be run off the fan belt of the engine, I prefer to connect my air compressor to run off the shaft 12 of the generator 11. To accomplish this I place a pulley wheel 13 on the generator shaft 12. The numerals 15 and 16 designate two rigid links spaced apart and rigidly secured together by an inverted stub angle iron brace 17 as shown in FIG. 2. At one end of the connected links is a shaft 19 and at the other end is a shaft 20 as shown in FIG. 4. Extending from the shaft 19 is a metal band 21 and extending from the shaft 20 is a metal band 22. To install my device, these two bands 21 and 22 are extended around the generator and the free ends of the bands are secured and drawn together by the bolt 23, thus rigidly detachably securing the link unit to the top of the generator as shown in FIG. 1. The numeral 24 designates a base platform having two vertical end ears 25 and 26 extending at each side, respectively, of the links 15 and 16 that make up the link unit. The numeral 27 designates a bolt rotatably extending through the ears 25 and 26, the two links 15 and 16, and under the angle iron 17. The numeral 29 designates a handled nut threaded on the outer end of the bolt. The numeral 30 designates an ordinary air compressor having the actuating shaft 31 and the air outlet hose 32, adapted to lead to point of compressed air usage. This compressor is secured on the base platform 24 and the compressor has a pulley wheel 33 on its shaft 31. The numeral 34 designates an endless belt embracing the pulley wheel 13 and the pulley wheel 33. The base platform and compressor, when swung upwardly, will move away from the generator shaft 12 and the pulley wheel 33 will move away from the pulley wheel 13, thereby tightening the belt 34. With the belt so tightened the rotation of the generator shaft will rotate the air compressor shaft, and air will pass from the flexible hose 32. To hold the belt in such taut condition the hand nut 29 is tightened. To shut off the compressor, it is merely necessary to swing the compressor and its base platform downwardly as shown by broken lines in FIG. 1. This action brings the pulley wheels 13 and 33 relatively closer together, and the belt thereon is so loose as to be idle. To prevent the slack belt from becoming accidentally detached completely from one of the pulley wheels, I have provided a belt retaining cage 35 operatively secured to the compressor. This cage has two spaced fingers 36 and 37 extending just outside the periphery of the pulley wheel 33 as shown in FIG. 1. This cage also has a finger 39 extending outside one belt length between the two pulley wheels and also a finger 40 extending outside the other belt length between the two pulley wheels. By this construction the belt will not unduly bow between the two pulley wheels when in loose condition, but will merely protrude endwise beyond the bottom of the pulley 13 as shown by broken lines in FIG. 1.

From the foregoing it will be obvious that my compressor may be easily and quickly installed, and easily and quickly power connected whenever a source of air under pressure is needed.

Some changes may be made in the construction and arrangement of my air compressor for internal combustion engine powered automotive vehicles without departing from the real spirit and purpose of my invention, and it is my intention to cover by my claims, any modified forms of structure or use of mechanical equivalents which may be reasonably included within their scope.

I claim:
1. In an air compressor mounting, two spaced apart links, a brace secured between said two links binding said links into a unit, a band extending from each of the two ends of the unit composed of said two links and brace, a bolt extending through the two free ends of said bands, an air compressor base platform having two spaced ears at one of its ends, and a pin means extending through the two ears of said base platform and through the said two links.

2. In an air compressor mounting, two spaced apart links, a brace secured between said two links binding said links into a unit, a band extending from each of the two ends of the unit composed of said two links and brace, a bolt extending through the two free ends of said bands, an air compressor base platform having two spaced ears at one of its ends, and a nut handled bolt means extending through the two ears of said base platform and through the said two links.

References Cited in the file of this patent
UNITED STATES PATENTS

| | | |
|---|---|---|
| 703,907 | Fellows | July 1, 1902 |
| 1,095,242 | Swift | May 5, 1914 |
| 1,377,403 | David | May 10, 1921 |
| 1,542,548 | Gordon | June 16, 1925 |
| 1,858,564 | See | May 17, 1932 |
| 2,258,009 | Horton | Oct. 7, 1941 |
| 2,461,174 | Peterman | Feb. 8, 1949 |
| 2,480,619 | Uhlin | Aug. 30, 1949 |
| 2,902,205 | Parker | Sept. 1, 1959 |
| 2,963,217 | Wysong | Dec. 6, 1960 |